G. D. SUNDSTRAND.
BEVEL GEAR GENERATOR.
APPLICATION FILED DEC. 1, 1916.

1,244,659.

Patented Oct. 30, 1917.
6 SHEETS—SHEET 4.

Witness:
J. P. Derick.

Inventor:
G. D. Sundstrand
Miller Chindahl Parker
attys.

UNITED STATES PATENT OFFICE.

GUSTAF DAVID SUNDSTRAND, OF ROCKFORD, ILLINOIS, ASSIGNOR TO ROCKFORD TOOL COMPANY, OF ROCKFORD, ILLINOIS, A CORPORATION OF ILLINOIS.

BEVEL-GEAR GENERATOR.

1,244,659.  Specification of Letters Patent.  Patented Oct. 30, 1917.

Application filed December 1, 1916. Serial No. 134,280.

*To all whom it may concern:*

Be it known that I, GUSTAF DAVID SUNDSTRAND, a citizen of the United States, residing at Rockford, in the county of Winnebago and State of Illinois, have invented certain new and useful Improvements in Bevel-Gear Generators, of which the following is a specification.

This invention relates to improvements in the type of bevel-gear generators shown in the Patents Nos. 547,571, 588,738 and 605,982 granted to H. C. Warren.

Among the objects of the invention are to provide improved means for producing the generating movement of the gear-blank and cutters; to improve the means for indexing the gear-blank; to improve the means for automatically reversing the direction of travel of the cutters; and to simplify the drive for the cutters.

In the accompanying drawings, Fig. 2ª is a fragmental front view of the blank-supporting, rolling and indexing devices. Fig. 3ª is a sectional view of the reversible drive for the cutter slides. Fig. 6ª is a fragmental detail of one of the cutters. Fig. 7ª is a section on line *a* of Fig. 7. Fig. 9ª is a section on dotted line *a—a* of Fig. 9. Figs. 13ª and 13ᵇ are detail views of a part of the indexing mechanism showing different positions. Fig. 13ᶜ is a section on dotted line *c* of Fig. 13.

In generating gear-teeth with the machine herein shown, the conical gear-blank *a*, which will, of course, be of the requisite size for producing a finished gear-wheel of the desired size, will be intermittently and progressively advanced, rotatively, a tooth-arc distance at each movement thereof to bring the tooth-forming portions of the blank successively into position to be acted upon by the cutters, and at the completion of each intermittent rotative movement of said blank the cutters will be fed progressively forward along the tooth-forming face of the gear-blank toward the geometrical apex of said blank and in the plane of the tooth-faces being cut, and during the progressive cutting operation of the cutters said cutters will be oscillated in a plane transverse to the axis of the said gear-blank and the gear-blank will preferably be reciprocated, rotatively, in synchronism and in a coinciding direction with the cutters to effect a rolling action of the cutters in lines transversely of the plane of the forward movement of the cutters, and thereby generate by a sinuous cutting operation a theoretically-correct tooth-face, all of which will be more fully hereinafter described.

Owing to the fact that the spaces between teeth in bevel-gears are of gradually reduced width toward the apexes thereof, I employ a relatively thin cutter adapted for freely passing through the narrowest part of the tooth-space, and for this purpose, and also for the purpose of facilitating the operation of generating a full complement of gear-teeth in the gear-blank and to obviate the necessity of revolving the gear-blank more than once, I preferably employ in connection with the organization of mechanism illustrated in the drawings, a plurality of tooth-face generating-cutters (herein shown as circular milling-cutters, and two in number) in position and adapted for generating the adjacent faces of adjacent teeth, one cutter acting upon and generating one face of one tooth, and the adjacent cutter acting upon and generating the adjacent face of the next adjacent tooth.

The embodiment herein shown of the invention comprises a base or main frame 1 having a circular guide 2 upon which is mounted a table 3. The table has a central hub or bearing 4 (Fig. 3) which is rotatably mounted upon a vertical pivot 5 fixed to the base 1. The table is oscillated upon the pivot 5 by means including a bevel gear segment 6 (Figs. 2 and 3) fixed to the table, said segment meshing with a bevel pinion 7. The pinion 7 is secured upon a shaft 8 which has fixed thereto a bevel gear 9 that meshes with a similar gear 10. Rigid with the gear 10 is a gear wheel 11 (Figs. 2 and 4) which meshes with a gear wheel 12. The gear wheel 12 is mounted upon an arm 12$^a$ that may be raised to disengage the gear 12 from the gear 11 for a purpose to appear hereinafter. The gear wheel 12 meshes with a gear wheel 13 which is fixed upon one end of a rocker shaft 14. Upon the other end of the shaft 14 is releasably clamped a gear wheel 15 that meshes with a segment 16 (Fig. 1) pivoted at 17. Rigid with the gear segment 16 is an arm 18 to which is adjustably connected a pitman 19 which is pivoted upon a wrist pin 20 carried by the gear wheel 21. The gear wheel 21 meshes with a pinion 22. Rigid with the pinion 22 is a gear wheel 23 that meshes with a pinion 24 fixed upon the drive shaft 25. Said shaft carries a drive pulley 26.

Figure 4:
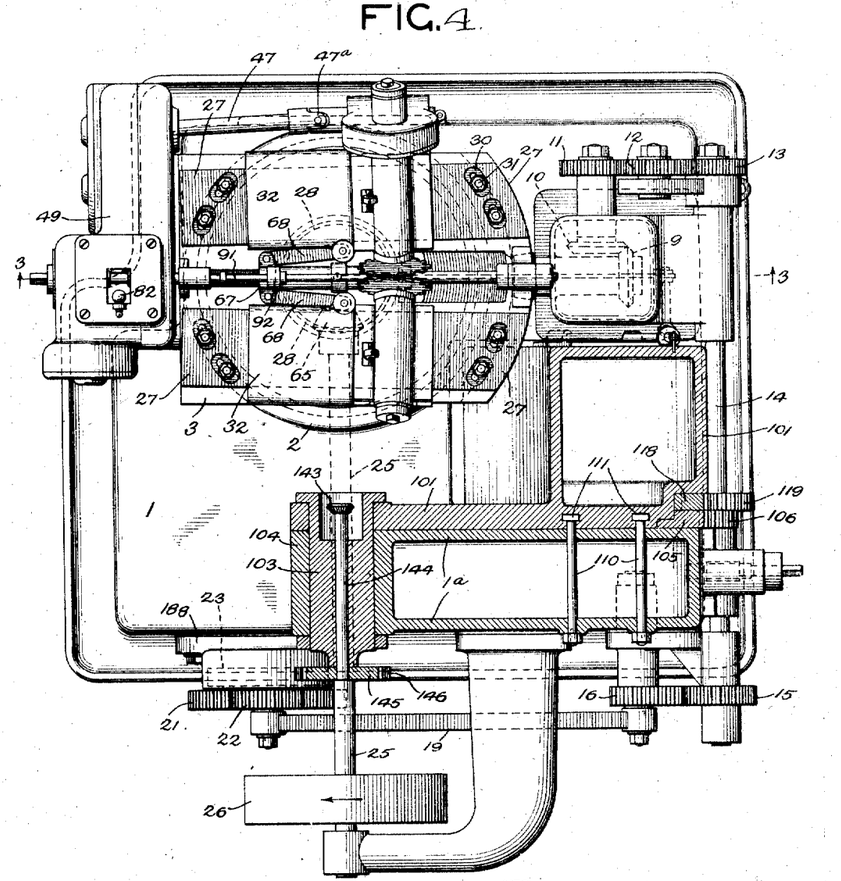
Fig. 4 is a horizontal sectional view taken approximately in the plane indicated by dotted line 4 in Fig. 1.
Figures 7, 7A, 8, 9, 9A:
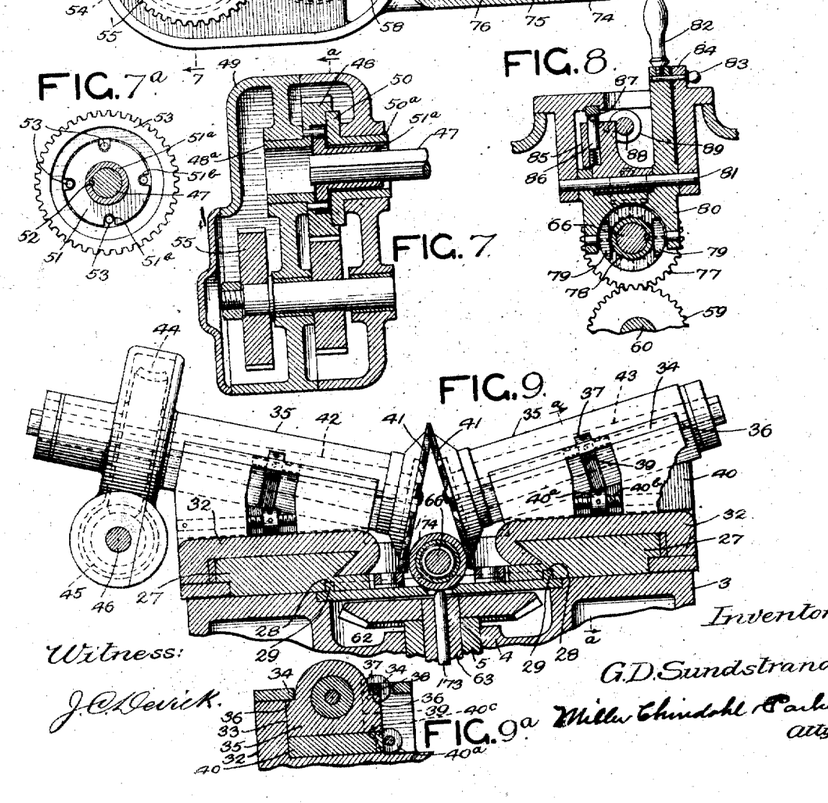
Fig. 7 is a section on dotted line 7—7 of Fig. 6.
Fig. 8 is a sectional view taken approximately in the plane of line *a* of Fig. 3ª but showing the clutch in neutral position.
Fig. 9 is a view of the cutters and adjacent parts.

Upon the table 3 are two guides 27 (Figs. 4 and 9). In the lower faces of these guides are formed grooves 28 which are curved upon the arcs of a circle concentric with the pivot 5. In these grooves are curved guide ribs 29 which are rigidly fixed to the table 3. It will be seen that the guides 27 may be turned so as to diverge more or less from each other, as shown in Fig. 4, the guides being held in adjusted position by means of nuts 30 turned upon screw studs 31 which are fixed to the table and extend through longitudinal openings in the guides. The angle between the guides 27 depends upon the pitch of the gear to be cut.

Upon the guides 27 are mounted cutter-supporting slides 32 (Figs. 9 and 9$^a$) each provided with a guide 33, said guide having two guide flanges 34 overhanging opposite sides of the guideway. Within the guide is a bearing 35 having longitudinal guide shoulders 36 adapted to slide in contact with the guide flanges 34. 37 is a nut mounted upon a screw 38 which is fixed in the guide 33, a portion of said nut extending into a recess 39 in the bearing 35. It will be seen that by rotating the nut 37 the bearing 35 may be slid within the guide 33. After the bearing has been longitudinally adjusted to the desired position by means of the nut 37, the bearing is locked in such position by means of a wedge 40 interposed between the bearing and the slide 32, said wedge being reciprocable by means of a nut 40$^a$ mounted on a screw 40$^b$ fixed in the seat, a portion of said nut engaging within a recess 40$^c$ in the wedge.

The milling cutters 41 are fixed upon the adjacent ends of shafts 42 and 43 supported in the bearings 35. The cutters are arranged side by side but in planes inclined to each other. The teeth of the cutters 41 are arranged to mesh at the upper portions of said cutters. It will be evident that by means of the nuts 37 the cutters 41 may be adjusted toward or away from each other. This, however, need be done only when erecting the machine or when putting on new cutters. When the axes of the cutters intersect the axis of the table 3, the peripheral edges of the cutting faces of the cutters should be tangent to each other at the apex of the pitch cone.

The shaft 43 is driven from the shaft 42 by reason of the fact that the cutters 41 are in mesh with each other. Fixed to the shaft 42 is a worm wheel 44 that meshes with a worm 45 fixed upon a shaft 46. A shaft 47 (Fig. 2) is connected to the shaft 46 by means of a universal joint 47$^a$. As shown in Fig. 7, a gear wheel 48 having a hub 48$^a$ is rotatably mounted in a gear case 49 which is rigidly secured to the table 3. Fixed to the side of the wheel 48 is a disk 50 having a hub 50$^a$ which is rotatably supported in the gear case. The gear wheel 48 is chambered to receive a disk 51 having a hub 51$^a$ through which the shaft 47 is slidable. A spline 52 (Fig. 7$^a$) compels the shaft 47 to rotate with the disk 51. Pins 53 fixed to the wheel 48 and lying loosely within notches 51$^b$ in the disk 51 serve to drive said disk. The gear 48 meshes with a gear 54 which is rigid with a gear 55. The gear 55 meshes with a gear 56 (Fig. 6) which last mentioned gear is rigid with a gear 57 that meshes with a gear 58. The gear 58 meshes with a gear wheel 59 (Fig. 3) which is fixed upon a shaft 60. Rigidly mounted on the shaft 60 is a bevel gear 61 that meshes with a bevel gear 62 fixed upon a vertical shaft 63 supported within the tubular pivot 5. Fixed upon the shaft 63 is a bevel gear 64 that meshes with a bevel pinion 65 (Fig. 4) which is fixed upon the drive shaft 25.

The means for reciprocating the slides 32 comprises a lead screw 66 (Fig. 3), said lead screw being mounted in suitable bearings upon the table 3 and in the gear case 49, and extending between the slides 32. Upon the lead screw 66 is a nut 67 which is connected by means of links 68 (Fig. 4) to the slides 32. The lead screw 66 is rotated alternately in opposite directions in order to reciprocate the slides 32. The means for rotating the lead screw 66 in the forward or cutting direction comprises a worm wheel 69 (Figs. 3 and 6) which is rotatably mounted upon the lead screw and meshes with a worm 70. The worm 70 is driven through the gear train 71, 72, 73, 74, 75 and 76, the bevel gear 76 being fixed upon the shaft 60. It will be remembered that this shaft is constantly driven from the main shaft 25 through the gear train shown in Figs. 3 and 4.

The means for rotating the lead screw 66 in the reverse direction to return the cutters to initial position comprises a gear wheel 77 (Fig. 3) loosely mounted upon said lead screw and meshing with the gear wheel 59 fixed on the shaft 60.

The gear wheels 69 and 77 (Fig. 3) run in opposite directions and are alternately clutched to the lead screw 66 by means of a clutch member 78 (Figs. 3ª and 8), said clutch member being slidable longitudinally of the lead screw but connected thereto by means of a spline, so that the clutch member and the lead screw rotate together. The clutch member 78 is adapted to engage clutch faces secured to the sides of the gear wheels 69 and 77. The clutch member is provided with a peripheral groove in which lie two shoes 79 (Fig. 8) which shoes are pivoted to a yoke 80 which, in turn, is mounted upon a pivot 81. Rigid with the yoke 80 is a hand-lever 82. The hand lever may be fixed in neutral position by means of a pin 83 adapted to be inserted into registering openings in the hand lever and a lug 84 on the gear case 49. Loosely mounted upon the pivot 81 is an arm 85. Said arm has two oppositely-extending lugs 85ª that overlie lugs 80ª on the yoke 80. The lugs 85ª carry stop screws 85ᵇ that are arranged to engage the lugs 80ª. It will be apparent from Fig. 3ª that limited pivotal movement is possible between the yoke 80 and the arm 85. Said arm carries a spring plunger 86 that has a V-shaped end adapted to engage a V-shaped tooth 87 on the gear case 49. A rod 88 is longitudinally slidable in the gear case 49 and has fixed thereto two collars 89 (Figs. 3 and 8) between which the arm 85 lies. Rigid with the rod 88 is an arm 90 to which is fixed a rod 91 (Fig. 3) which extends freely through a lug 92 that is rigid with the nut 67. On the rod 91 are two collars 93 and 94 at opposite sides of the lug 92. The collars 93 and 94 are adjustably secured upon the rod 91 so that they may be set at different points along the length of said rod in order to effect the shifting of the clutch collar 78 at desired times. Assuming the clutch collar to be in engagement with one of the lead-screw-driving wheels 69 and 77, it will be seen that when the lug 92 collides with one of the collars 93 and 94, the rod 91 will be moved in the continuing movement of the lug 92, whereby the arm 85 will be moved until the V-shaped end of the plunger 86 has passed the point of the V-shaped tooth 87, whereupon the pressure of the spring plunger against the V-shaped tooth will cause the arm 85 to complete its movement and place the clutch collar 78 in engagement with the other lead-screw-driving wheel. The lost-motion connection between the yoke 80 and the arm 85 permits the clutch member 78 to remain in engagement with one driving wheel until the point of the tooth 86 has passed the point of the tooth 87, when the continuing movement of the arm 85 causes the yoke to swing to move the clutch member into engagement with the other driving wheel.

The return movement imparted to the slides 32 through the spur gear wheel 77 is more rapid than the feed movement derived through the worm wheel 69.

The forward end of the lead screw 66 is squared to receive a hand crank (not shown).

The gear-blank $a$ may be secured to the work spindle 95 by means of a clamping rod 96, said rod having a head 97 at one end and a nut 98 at the other end. A spacer 99 of any suitable form and dimensions may be interposed between the blank and the lower end of the spindle 95. The spindle is rotatably supported in a bearing 100 (Fig. 2ª) carried by a slide 100ª, which slide is adjustably secured to a support or frame 101 by means of clamping screws 102. The screws 102 have heads that lie in T-slots 102ª in the frame 101. The slide 100ª may be moved by means of an adjusting screw 100ᵇ having a squared outer end, said screw engaging a sleeve-nut 100ᶜ fixed to the frame 101.

The axis of the spindle 95 intersects the axis of oscillation of the table 3. The bearing 100 and hence the spindle 95 are adjustable in the direction of their axis toward and away from the table 3 to a position suitable for a gear-blank of the diameter to be operated upon. The frame 101 has a trunnion 103 (Fig. 4) which is mounted in a bearing 104 on the base 1. The axis of the trunnion 103 intersects the axis of rotation of the table 3 and the axis of the spindle 95. It will thus be seen that the frame 101 is arranged to swing about an axis which intersects the axis of the blank spindle at the apex of the pitch cone of the bevel gear to be generated, thus adapting the machine to generate the teeth of bevel gears having pitch cones of varying angles. The means for pivotally adjusting the frame 101 comprises a curved rack or spur-gear segment 105 (Fig. 1) fixed to said frame and meshing with a pinion 106 (Fig. 2) rotatably mounted in the main frame 1. Rigid with said pinion is a worm wheel 107 that meshes with a worm 108. The shaft of the worm 108 has a squared end 109 to receive a hand crank (not shown). By rotating the worm 108 the frame 101 may be swung upon its trunnion 103 into the desired position. The frame may there be locked in place by means of clamping bolts 110 (Figs. 1 and 4) carried by a vertical portion 1ª of the main frame and having heads that lie in T-slots 111 in the frame 101.

Figure 5:
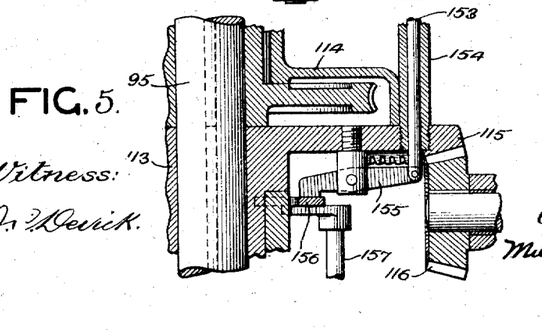
Fig. 5 is a fragmental sectional view showing, among other things, the means for rolling the gear-blank.

The means for rocking or oscillating the work spindle 95 will next be described. The frame 101 comprises a bearing 112 alined with the bearing 100. In the bearing 112 is rotatably supported a sleeve 113 which is rigid with a gear case 114. Rigid with the gear case 114 is a bevel gear segment 115 (Figs. 1, 5 and 10) which meshes with a bevel pinion 116 that is rigid with a pinion 117. The pinion 117 meshes with a curved rack or spur-gear segment 118 which is supported for movement upon the frame 101. The segment 118 meshes with a pinion 119 (Figs. 1 and 4) fixed upon the constantly-rocking shaft 14. The spindle 95 is caused to oscillate with the gear case 114 by reason of the fact that the gear case carries a worm 120 (Figs. 3 and 10) that meshes with a worm wheel 121 which is splined on the spindle.

Figure 1:
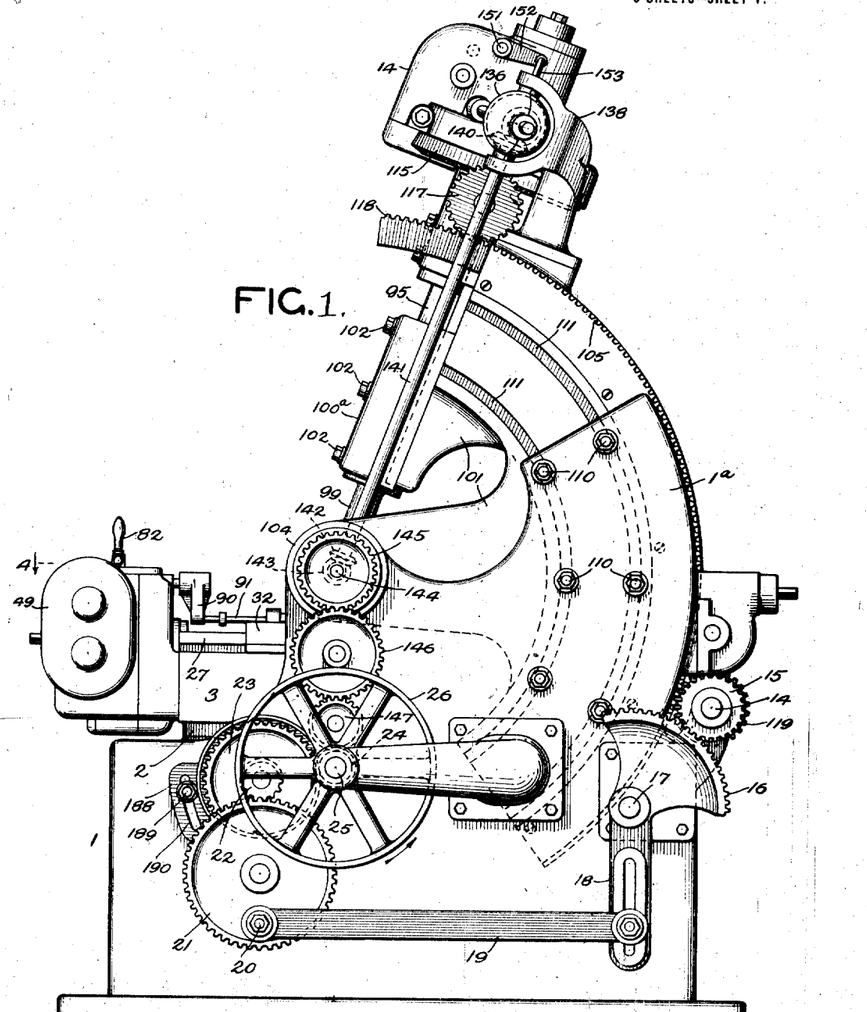
Figure 1 is a side elevation of a bevel-gear generator embodying the features of my invention.
Figures 2, 2A:
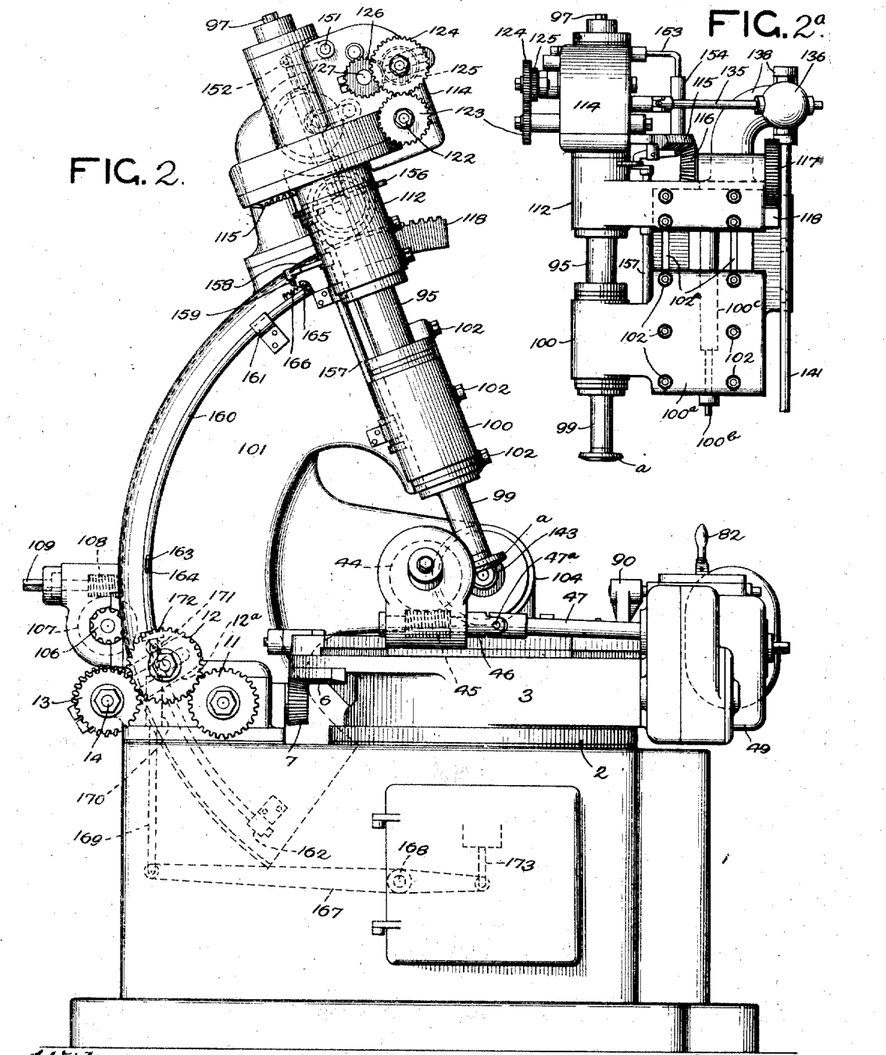
Fig. 2 is a view of the side opposite to that seen in Fig. 1.
Figures 10, 11, 12, 13, 13A, 13B, 13C:
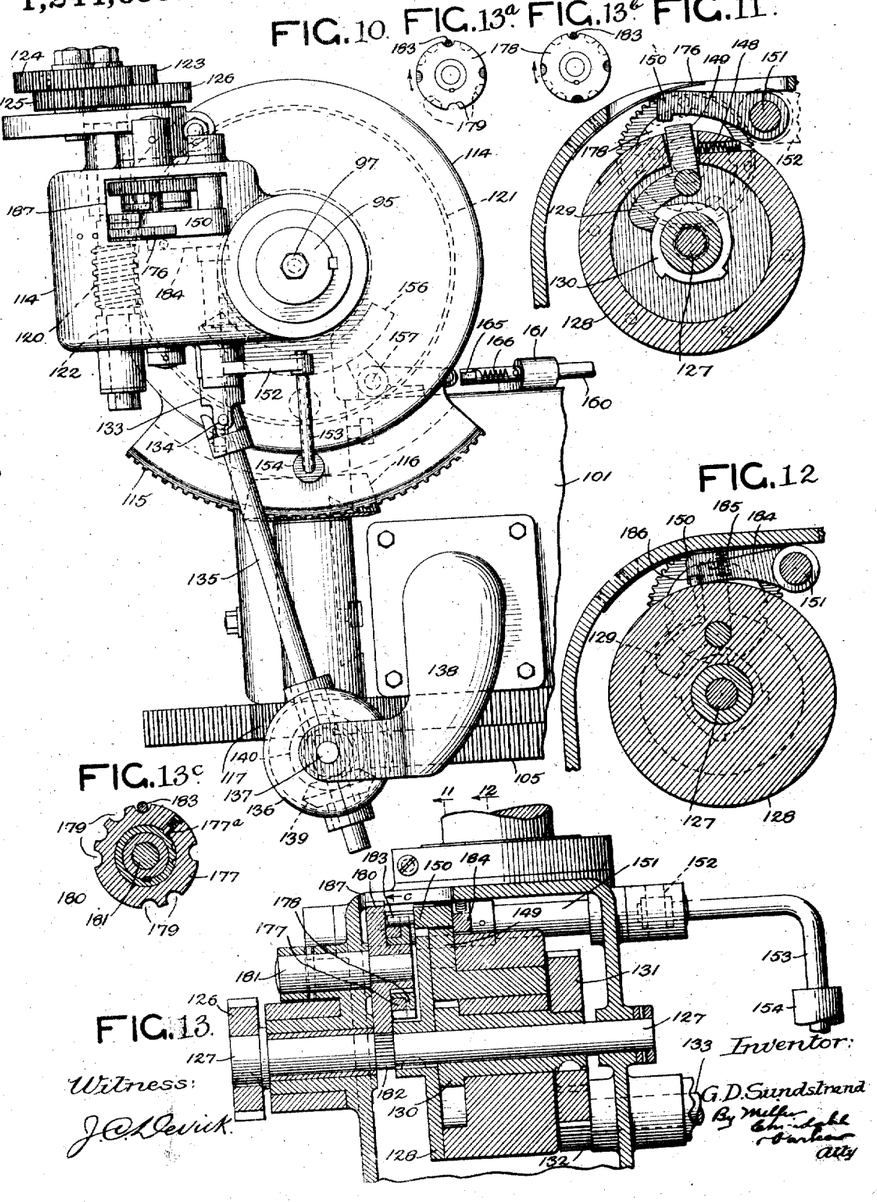
Fig. 10 is a top plan view of the blank-indexing mechanism and adjacent parts.
Figs. 11, 12 and 13 are sectional views of the indexing mechanism, Fig. 11 being taken in the plane of dotted line 11 of Fig. 13, and Fig. 12 being a view on dotted line 12 of Fig. 13.

After a tooth space or groove has been completed in the gear blank a, the spindle 95 is turned with relation to the gear case 114 in order to bring another portion of the blank into position to be grooved by the cutters 41. The means for thus indexing the gear blank includes the worm 120 and the worm wheel 121 hereinbefore mentioned. The worm 120 is mounted upon a shaft 122 to which is fixed a change gear 123 (Fig. 2). The gear 123 meshes with a change gear 124 which is rigid with a gear 125. The latter meshes with a gear 126 which is fixed upon a shaft 127. Also fixed upon the shaft 127 is a drum 128 (Fig. 13) carrying a dog 129 (Fig. 11). This dog is adapted to be engaged by a ratchet wheel 130 which is rotatably mounted upon the shaft 127 within the drum 128. Fastened to the hub of the ratchet wheel 130 is a spur gear wheel 131 (Fig. 13) that meshes with a pinion 132 fixed upon a shaft 133. The shaft 133 is connected by means of a universal joint 134 (Fig. 10) with a shaft 135 that extends slidably through a gear case 136 which is pivotally supported at 137 in a bracket 138 fixed to the frame 101. Within the gear case 136 is rotatably supported a bevel gear 139 which is splined to the shaft 135, said shaft being freely slidable longitudinally of the gear 139. Within the gear case 136 is a bevel gear 140 that meshes with the bevel gear 139 and is fixed to a shaft 141 (Fig. 1). The shaft 141 is axially alined with the pivot 137. To the lower end of the shaft 141 is fixed a bevel gear 142 that meshes with a bevel gear 143 fixed upon a shaft 144. The shaft 144 is rotatably supported in the center of the trunnion 103. The shaft 144 is driven from the shaft 25 through the gear train 145, 146, 147 and 24. The ratchet wheel 130 is therefore constantly rotating. A spring 148 (Fig. 11) acting against a finger 149 fixed with relation to the dog 129 tends to swing the dog into the path of the teeth of the ratchet wheel 130. The dog 129 is normally held away from said teeth, as shown in Fig. 12, by means of a hook 150 adapted to engage the finger 149, said hook being fixed to a rock shaft 151.

When the cutters have returned to their initial position, the hook 150 is raised by the tripping shaft 151 to allow the dog 129 to be engaged by the ratchet wheel 130, thereby causing the shaft 127 to be rotated one or more times and thus causing the spindle 95 to turn through the proper distance to enable the cutters, upon their next forward movement, to form the next tooth space. The means for raising the hook 150 comprises an arm 152 (Fig. 1) fixed to the shaft 151 and pivoted to a rod 153. The rod 153 extends slidably through a guide 154 (Figs. 5 and 10) on the gear case 114. The lower end of the rod 153 is pivoted to one arm of a lever 155 carried by the gear case, the other arm of said lever resting upon a plate 156. The plate 156 is curved upon the arc of a circle concentric with the axis upon which the gear case 114 oscillates, and said plate is of sufficient length so that it is always beneath the lever 155. The plate 156 is secured to a rod 157 (Figs. 2 and 5) which is supported for longitudinal movement upon the frame 101. Fixed to the rod 157 is an arm 158 carrying a beveled pin 159. A rod 160 curved upon the arc of a circle concentric with the trunnion 103 is supported upon the frame 101 in the bearings 161 and 162. Intermediate the bearings 161 and 162 the rod 160 has an elongated opening 163 through which extends a guide pin 164 set in the frame 101. Upon the upper end of the rod 160 is a beveled pin 165 adapted upon the upward movement of the rod 160 to pass under and lift the pin 159 and thus lift the plate 156 and the adjacent arm of the lever 155, whereby the shaft 151 is turned to raise the hook 150 out of engagement with the finger 149. The finger 165 is adapted to yield pivotally upon the downward movement of the rod 160 so as to pass the pin 159. A spring 166 normally holds the pin 165 in the position shown in Fig. 2.

The means for raising the rod 160 comprises a lever 167 pivoted at 168 to the machine frame. One arm of said lever carries a rod 169 which is slidably mounted in a guide 170 on the machine frame, the upper end of said rod carrying a roller 171 that underlies a collar 172 which is adjustably mounted upon the rod 160. The other arm of the lever 167 carries a rod 173 (Fig. 3) which extends axially of the shaft 63. The upper end of the rod 173 is beveled for engagement by a correspondingly beveled surface upon the collar 174 fixed upon a tube 175 which is rigid with the nut 67 and surrounds the lead screw 66. When, in the return movement of the cutters, the collar 174 engages and forces downward the rod 173, the rod 160 is lifted to raise the plate 156 and thus cause the hook 150 to be moved away from the finger 149. A spring 176 (Fig. 11) tends to move the hook 150 downwardly.

The hook 150 is held up out of the orbit of the finger 149 for the required length of time by means of an adjustable device comprising two notched plates 177 and 178 (Figs. 13, 13$^a$ and 13$^b$). These disks have notches 179 in their peripheries. In the construction herein shown, the disk 177 has seven notches 179, while the disk 178 has four notches. The disks are located side by side and are relatively adjustable so as to bring desired notches in the disks into register. In Fig. 13$^a$ the disks are shown as so adjusted that notches are in register at two diametrically opposite points. In Fig. 13$^b$ the disks are shown as so adjusted that notches are in register at only one point. The disks may be adjustably secured together in any suitable manner, as by means of a spring plunger 177$^a$ (Fig. 13$^c$) carried by the disk 177 and adapted to enter concave notches in the disk 178. The disk 178 is fixed upon the hub of a spur gear wheel 180 (Fig. 13) which is rotatably mounted upon a stub shaft 181 in the gear casing 114. The spur gear 180 meshes with a pinion 182 which is rigid with the shaft 127. A pin 183 on the hook 150 is adapted to ride upon the peripheries of the disks 177 and 178 and drop into two registering notches 179 in said disks. In the construction herein illustrated, the ratchet wheel 130 makes four revolutions to one revolution of the disks 177 and 178. Normally the hook 150 is in engagement with the finger 149, and the pin 183 lies in two registering notches in the disks 177 and 178. When the hook 150 is lifted out of engagement with the finger 149, the pin 183 is held up by the peripheries of the disks 177 and 178 until two registering notches in said disks reach said pin, whereupon the hook 150 drops into the path of the finger 149 and thus causes the dog 129 to be disengaged from the ratchet wheel.

To prevent rebound of the drum 128 and consequent vibration of the spindle 95 when the finger 149 strikes the hook 150, I provide a dog 184 (Fig. 12) which is loosely mounted upon the shaft 151 and is yieldingly held in contact with the periphery of the drum 128 by means of a spring 185. Set in the periphery of the drum 128 is a stop pin 186. By the time that the hook 150 has disengaged the dog 129 from the ratchet wheel 130 the stop pin 186 has just passed the locking dog 184. It will be seen that when the parts are in the position shown in Fig. 12, the hook 150 prevents rotation of the drum 128 in one direction, and the stop pin 186 and the locking dog 184 prevent rotation of the drum in the opposite direction.

When it is desired to change the adjustment of the disks 177 and 178, access is had to said disks through the opening 187 (Figs. 10 and 13) in the gear case 114.

In operation, the cutters 41 are fed from right to left (Fig. 3), said cutters forming a tooth space in the blank as they are fed in said direction. During their leftward travel the cutters gradually approach each other (as will be understood by reference to Fig. 4) by reason of the inclination of the guides 27, thus causing the tooth space to taper toward the apex of the pitch cone of the bevel gear being formed. While the cutters are being advanced, the table 3 and the blank-carrying spindle 95 are oscillated in synchronism, whereby the tooth space in the blank is generated through the rolling of the cutters and the blank upon each other. The collar 93 is located upon the rod 91 in such position that when the cutters have passed through the blank, the lug 92 strikes said collar 93 and thereby causes the clutch member 78 to be shifted into engagement with the spur gear wheel 77, thus causing the direction of rotation of the lead-screw 66 to be reversed. The cutters are then caused to travel at a greater speed in the right-hand direction (Fig. 3), the cutters traveling through the tooth space just formed. As soon as the cutters have passed through said tooth space, the collar 174 engages the rod 173 and causes the indexing mechanism to be actuated to turn the blank through the distance of one tooth and thus place the blank in position for the cutting of the next tooth space. By the time the indexing of the blank has been effected, the lug 92 has engaged the collar 94 and caused the clutch member 78 to be placed in engagement with the worm wheel 69, whereupon the cutters are fed through the blank in the leftward direction.

The frame 101 is adjusted upon the axis of its trunnion 103 into position to correspond with the root cone of the gear to be formed. Before adjusting the frame, the arm 12$^a$ is raised to separate the gears 11 and 12, and the pinion 15 is unclamped from the rocker shaft 14. After the frame 101 and the parts carried thereby (including the segment 118) have been adjusted to the desired angle, the gears 11 and 12 are placed in mesh with each other, and the pinion 15 is fixed upon the rocker shaft.

The bearing 100 carrying with it the spindle 95 is adjusted up and down on the frame 101 as required to present blanks of varying diameters to the cutters.

The change gear train 123, 124, 125 and 126 and the hook-controlling disks 177 and 178 permit the length of the indexing movement to be adjusted to correspond with the pitch of the gear to be formed.

By reference to Fig. 4, it will be seen that the pivotally-adjustable frame 101 has a single trunnion 103 which projects from said frame in a direction away from the table 3. As shown in Fig. 2, the bearings 100 and 112 are located at one side of the frame 101. The trunnion 103 and the bearings 100 and 112 project from opposite sides of the frame 101. By reason of this construction and arrangement of the parts, ample space is provided for the table 3 in its oscillating movement, and provision is made for supporting gear blanks of large diameter and of various root cones.

Referring to Fig. 1: The gear wheels 22 and 23 are supported upon a bracket 188 which is pivoted upon the axis of the shaft 25 and is held in adjusted position by means of a clamping screw 189 extending through a slot 190 in said bracket and into the base of the machine. If it be desired to form the teeth of the gear blank in two operations, the bracket 188 may be raised to disengage the pinion 22 from the gear wheel 21, and the teeth "roughed out" while the table 3 and the gear case 114 are stationary at the central point of their arc of oscillation. After the gear blank has made a complete revolution, the generating movement may be thrown in by lowering the bracket 188 to normal position, and the blank rotated step-by-step through a second revolution, during which revolution the cutters complete the cutting of the teeth.

Figures 6, 6A:
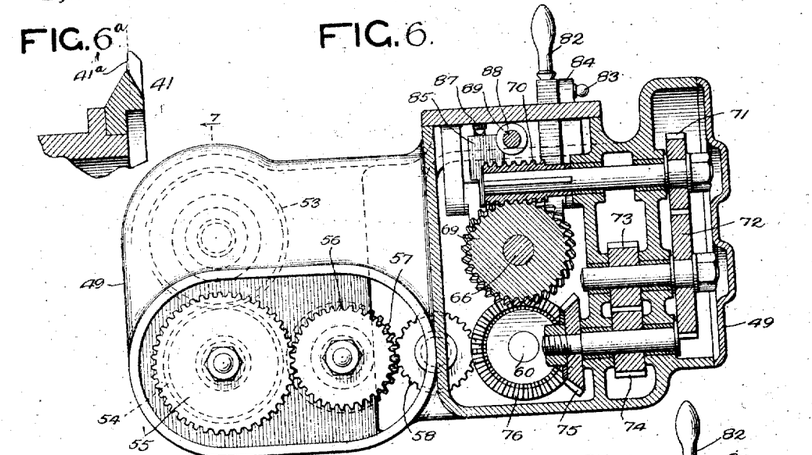
Fig. 6 is a vertical sectional view taken in the plane of dotted line 6 of Fig. 3.

When the cutting faces 41ª of the cutters are at right angles to the axes 42—43 of the cutters, a slight bur on the cutting face will produce scratches on the gear being formed. It is therefore preferable to make the cutting face slightly conical, as it has been found that when so made a slight bur on the cutting edge does not cause scratches. If the teeth of the gear to be cut are formed with a 14½° pressure angle, the axes may be set at an angle of 14° and the cutting faces of the cutters inclined at an angle of one-half degree from a plane perpendicular to the respective axes of the cutters. In Fig. 9, the inclination referred to of the cutting face is not perceptible. In Fig. 6ª, the perpendicular is indicated by a dotted line.

Figures 3, 3A:
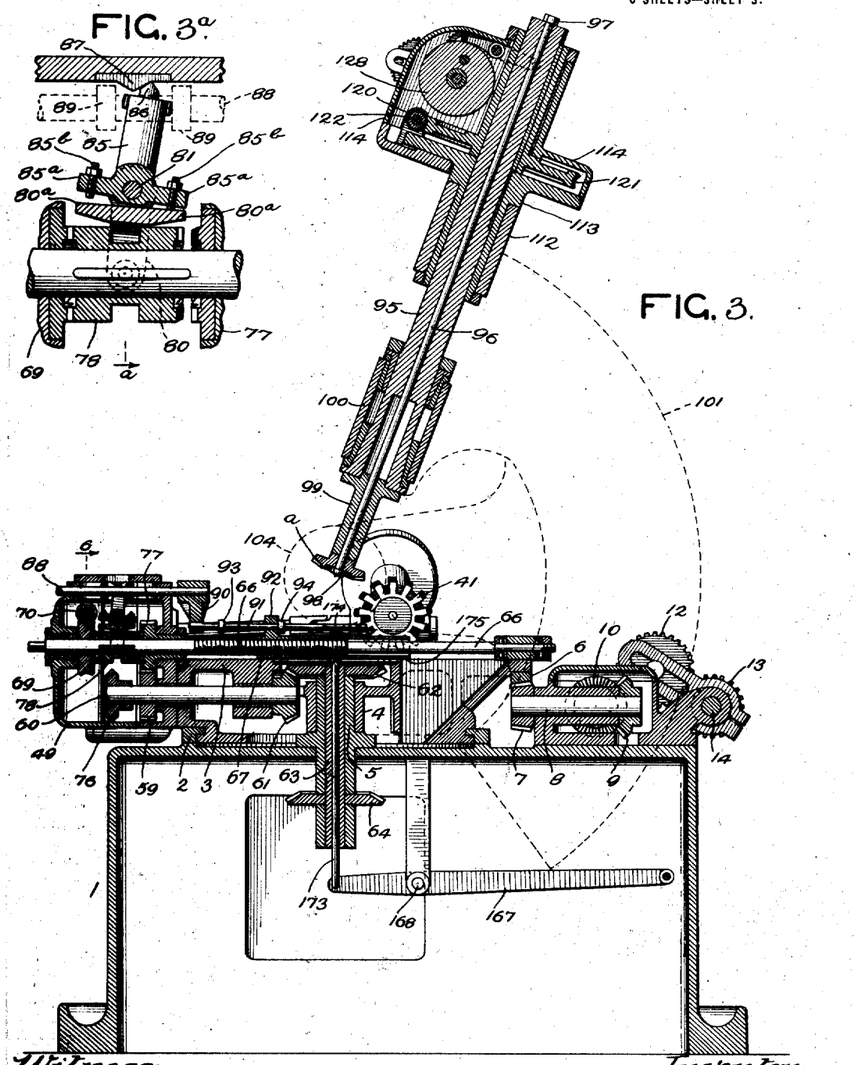
Fig. 3 is a vertical sectional view taken approximately in the plane of dotted line 3—3 of Fig. 4.

The description hereinbefore given of the operation of the machine may be summarized as follows. Referring to Fig. 3: In traveling toward the left, the cutters form a groove in the blank. Owing to the oscillating movements of the table 2 and the gear blank, occurring during the travel of the cutters, the side walls of the groove are shaped to form the adjacent sides of two correctly generated gear teeth. While the cutters are thus advancing through the work, the cutters are approaching each other because of the convergence of the guides 27, hence the tooth space or groove becomes tapered toward the apex of the pitch cone of the bevel gear being generated. The tooth space having been completed, the travel of the cutters is reversed, the return movement thereof being at a greater speed than the working stroke. After the cutters have returned clear of the blank, the latter is turned through the distance of one tooth space by the indexing mechanism. The travel of the cutters is then reversed, and another tooth space formed in the blank. When the gear has been completed, the operator stops the machine, replaces the finished gear with a blank, and restarts the machine.

I claim as my invention:

1. A machine for generating gear teeth having, in combination, cutting means comprising a plurality of intermeshing cutters adapted to occupy a tooth-space, devices for supporting said cutters, means for rectilinearly reciprocating said supporting devices, each stroke thereof being continuous, means for oscillating said supporting devices, and means for rotating a single one of said cutters whereby all of said cutters will be rotated, said rotating means including a flexible connection, whereby said cutters may be rotated, reciprocated and oscillated synchronously.

2. A machine for generating gear teeth having, in combination, cutting means comprising a plurality of intermeshing rotatable cutters adapted to occupy a tooth-space, devices for individually and adjustably supporting said cutters, said supporting devices being angularly adjustable with relation to each other, means for oscillating said supporting devices, means for rectilinearly reciprocating said supporting devices, said reciprocating means having automatic reversing means, said cutters alternately converging and diverging upon the forward and return movements of said supporting devices, and means for rotating said cutters synchronously with the said reciprocation, oscillation, convergence and divergence thereof.

3. A machine for generating gear teeth having, in combination, cutting means comprising a plurality of intermeshing cutters adapted to occupy a tooth space, means for rectilinearly reciprocating said cutters, each stroke thereof being continuous, and means for rotating a single one of said cutters whereby all of said cutters will be rotated.

4. A machine for generating gear teeth having, in combination, cutting means comprising a plurality of intermeshing cutters adapted to occupy a tooth-space, means for rectilinearly reciprocating said cutters, each stroke thereof being continuous, means for oscillating said cutters, and means for rotating a single one of said cutters whereby all of said cutters will be rotated.

5. A machine for generating gear teeth having, in combination, cutting means comprising a plurality of intermeshing cutters adapted to occupy a tooth slot, devices for supporting said cutters individually, said supporting devices being angularly adjustable with relation to each other, means for rotating a single one of said cutters whereby all of said cutters will be rotated, and means for imparting a rectilinearly reciprocating movement to said supporting devices whereby said supporting devices will alternately approach and diverge synchronously with said reciprocation.

6. A machine for generating gear teeth having, in combination, cutting means comprising a plurality of cutters adapted to occupy a tooth-space, devices for individually supporting said cutters, said supporting devices being angularly adjustable with relation to each other, means for oscillating said supporting devices, means for rectilinearly reciprocating said supporting devices, each stroke thereof being continuous, whereby said cutters will alternately converge and diverge, and means for rotating said cutters, said rotating means including flexible means whereby said cutters may be rotated, reciprocated and oscillated synchronously with the convergence and divergence thereof.

7. A machine for generating gear teeth having, in combination, cutting means comprising a pair of rotatable cutters adapted to occupy a tooth-space, devices for individually and adjustably supporting said cutters, said supporting devices being angularly adjustable with relation to each other, means for oscillating said supporting devices, means for rectilinearly reciprocating said supporting devices, said rectilinearly reciprocating means having automatic reversing means and a quick return movement, said cutters alternately converging and diverging upon the forward and the return movements of said supporting devices, and means for rotating said cutters, said rotating means including flexible means whereby said cutters may be rotated, reciprocated and oscillated synchronously with the convergence and divergence thereof.

8. A machine for generating gear teeth having, in combination, clutch-reversing means comprising a cam element on the machine, travel-limit means, a member actuated by said travel-limit means, a slidable clutch member adapted to engage driving means, an actuating device on said travel-limit actuated member, and connecting means operatively associated with said clutch member and said travel-limit-actuated member, said connecting means including a member having a lost motion connection with said clutch member, and a sliding contact with said cam element whereby the movement of said clutch member to engage said driving means is delayed and is thereafter quickly actuated.

9. A machine for generating gear teeth having, in combination, clutch reversing means comprising, in combination, a cam element on the machine, travel-limit means, a member actuated by said travel-limit means, a slidable clutch member adapted to engage driving means, an actuating device on said travel-limit actuating member, and connecting means operatively associated with said clutch member and said travel-limit-actuated member, said connecting means comprising a member having a lost motion connection with said clutch member, a contacting engagement with said actuating device, and a sliding contact with said cam element whereby the movement of said clutch member to engage said driving means is delayed and is thereafter quickly actuated.

10. A driving mechanism for rotating an element upon an oscillating part comprising a stationary part, a rotating driving member supported by the stationary part, a rotatable driven member oblique to said rotating member, a universal flexible connection having one end secured to the element and the other end secured to said rotatable driven member, means secured to said driving member and rotatable therewith, means slidably and non-rotatably carried by said rotatable driven member and operatively connected to said means secured to the driving member, and a bearing member having a pivotal connection with the stationary part, said bearing member rotatably and slidably supporting said rotatable driven member and engageably securing said operatively connected means upon said driven and driving members.

11. A machine for generating gear teeth having, in combination, work-holding means, cutting means, and means for synchronously oscillating said work-holding means and said cutting means, said oscillating means comprising a rotating member, a pitman eccentrically carried by said member, a gear segment adjustably and rigidly secured to said pitman, a rocker-shaft actuated by said gear segment, and separate means secured to said shaft and operatively connected to said work-holding means and said cutting means for synchronously oscillating the same.

12. A machine for generating gear teeth having, in combination, a gear-blank holder, a cutter adapted to occupy a tooth-space, means for rotating said cutter, means for synchronously oscillating the gear-blank and the cutter, said oscillating means including a common rocker-shaft, separate means secured to said shaft and operatively connected to said holder and said cutter, and eccentric means for actuating said shaft, means for automatically indexing said gear-blank holder independent of said oscillating means, and means for actuating all of said means.

13. A machine for generating gear teeth having, in combination, a base, a gear-blank support adjustably supported by the base, a gear-blank holder rotatably supported by said support, a table rotatably supported by said base, a cutter supported by said table and adapted to occupy a tooth-space, means for rotating said cutter, means for rectilinearly reciprocating said cutter, means synchronously oscillating said gear-blank holder and said cutter, said oscillating means including a rocker-shaft, a separate means secured to said shaft and operatively connected to said holder and said cutter, and eccentric means for actuating said shaft, actuating mechanism for automatically indexing said gear-blank holder, means operated by said reciprocating means for controlling the actuation of said indexing mechanism, and means for actuating all of said means.

14. An automatic machine for generating gear teeth having, in combination, a base, a member rotatable thereon, a support adjustably supported by the base, cutting means reciprocable on said member, work-holding means rotatable in said support, means for synchronously oscillating said member and said work-holding means, indexing means, and means operable in the reciprocatory movement of said cutters for actuating said indexing means to obtain relative movement between said cutting means and said work-holding means.

15. A machine for generating gear teeth having, in combination, a base, a gear-blank holder adjustably supported by said base, a table rotatably supported by said base, a cutter slidably supported by said table and adapted to occupy a tooth-space, means for rotating said cutter, means for rectilinearly reciprocating said cutter, means for synchronously oscillating said table and said holder, indexing mechanism for obtaining relative movement between said cutter and said gear-blank holder, and means for actuating all of said means.

16. A machine for generating gear teeth having, in combination, a base, a member rotatable thereon, a support adjustably supported by said base, cutting means reciprocable on said member, work-holding means rotatable in said support, means for synchronously oscillating said member and said work-holding means, adjustable indexing means carried by said work-holding means, and tripping mechanism operable in the reciprocatory movement of said cutters for tripping said indexing means to obtain relative movement between said cutting means and said work-holding means.

17. A machine for generating gear teeth having, in combination, a gear-blank holder, a plurality of intermeshing cutters adapted to occupy a tooth-space, means for rotating said cutters, means for synchronously oscillating the gear-blank holder and the cutters, automatic indexing means for obtaining relative movement between said cutters and said gear-blank-holder, and means for actuating all of said means.

18. A machine for generating gear teeth having, in combination, work-holding means, a plurality of intermeshing cutters adapted to occupy a tooth-space, means for rectilinearly reciprocating said cutters, each stroke thereof being continuous, means for oscillating said cutters, and means for rotating a single one of said cutters whereby all of said cutters will be rotated.

19. A machine for generating gear teeth having in combination, work-holding means, a plurality of intermeshing cutters adapted to occupy a tooth-space, and means for rectilinearly reciprocating said cutters, each stroke thereof being continuous.

20. A machine for generating gear teeth having, in combination, a base, cutting means rectilinearly reciprocable thereon, work-holding means, indexing means, and means operable by said cutting means for actuating said indexing means.

21. A machine for generating gear teeth having, in combination, a base, cutting means oscillatable and reciprocable thereon, oscillatory work-holding means supported by said base, indexing means, and means operable by said cutting means in the reciprocable movement thereof for actuating said indexing means.

22. A machine for generating gear teeth having, in combination, a base, cutting means rectilinearly reciprocable thereon, work-holding means, adjustable indexing means, and means operable by said cutting means for actuating said indexing means.

23. A machine for generating gear teeth having, in combination, a base, cutting means oscillatable and reciprocable thereon, oscillatory work-holding means supported by said base, adjustable indexing means, and means operable by said cutting means in the reciprocable movement thereof for actuating said indexing means.

24. A machine for generating gear teeth having, in combination, a base, reciprocable cutting means, oscillating work-holding means, means indexing said work-holding means, tripping means for actuating said indexing means comprising a tripping shaft, a slidable member operatively connected thereto, an arcuate plate transverse to and carried by said slidable member concentric with the axis of said oscillating work-holding means, and slidable means carried by said base and operatively connected to said arcuate plate for actuating said tripping shaft.

25. A machine for generating gear teeth having, in combination, a base, reciprocable cutting means, oscillating work-holding means, means indexing said work-holding means, tripping means for actuating said indexing means comprising a tripping shaft, a slidable member operatively connected thereto, an arcuate plate transverse to and carried by said slidable member concentric with the axis of said oscillating work-holding means, and slidable means carried by said base, operatively connected to said arcuate plate for actuating said tripping shaft and actuated by said reciprocable cutting means.

26. A machine for generating gear teeth having, in combination, a base, reciprocable cutting means thereon, a support adjustably secured to said base, oscillating work-holding means, indexing means for said work-holding means, tripping means carried by said oscillating means, actuating means on said support operatively connected to said tripping means, adjustable means comprising an arcuate member having a slidable connection with said support, a spring controlled dog pivotally secured near one end for slidably actuating said connecting means, and a collar adjustably secured near the base, and means secured to said base having a part contacting said collar for slidably actuating said arcuate member.

27. A machine for generating gear teeth having, in combination, a base, reciprocable cutting means thereon, a support adjustably secured to said base, oscillating work-holding means, indexing means for said work-holding means, tripping means carried by said oscillating means, actuating means on said support operatively connected to said tripping means, adjustable means comprising an arcuate member having a slidable connection with said support, a spring controlled dog pivotally secured near one end for slidably actuating said connecting means, and a collar adjustably secured near the base, and means secured to said base, actuated by said reciprocable cutting means and having a part contacting said collar for slidably actuating said arcuate member.

28. A machine for generating gear teeth having, in combination, a base, a rotatable cutter support, a rotatably adjustable support, the axis thereof intersecting the axis of said cutter support, adjustable work-holding means, the axis thereof intersecting the other two axes, a conical bevel gear blank secured to said holding means, the apex of said blank intersecting the intersection of said axes, cutting means comprising a plurality of cutters adapted to occupy a tooth slot, said cutters being adjustable and rotatable upon said rotatable cutter support, said cutters and said holding means being synchronously oscillatable, indexing means for said holding means, tripping mechanism actuated in the reciprocation of said cutters, and means for actuating all of said means.

29. A machine for generating gear teeth having, in combination, a main frame, a table mounted for oscillation on the main frame, a support, a trunnion thereon pivotally mounting said support on said frame for adjustment, the axis of said table intersecting the axis of said support at right angles, work-holding means mounted for oscillation on the support, the axis of said work-holding means intersecting the other two axes, and means located adjacent said support and said table and at one side of both for oscillating the work-holding means and the table.

30. A machine for generating gear teeth having, in combination, a main frame, a table mounted for oscillation on the main frame, a support, a trunnion thereon pivotally mounting said support on said frame for adjustment, the axis of said table intersecting the axis of said support at right angles, bearings on said support and work-holding means mounted in said bearings, the axis of said work-holding means intersecting the other two axes.

31. A machine for generating gear teeth having, in combination, a main frame, a table mounted for oscillation on the main frame, a support having a single trunnion located at one side of the table, the axis of said trunnion intersecting the axis of the table, bearings located on said support, said bearings being at one side of the support and said trunnion being at the other side thereof, and a work spindle carried by said bearings, the axis of said spindle intersecting the other two axes.

32. A machine for generating gear teeth having, in combination, a main frame, a table mounted for oscillation on the main frame, a support having a single trunnion located at one side of the table, the axis of said trunnion intersecting the axis of the table, bearings located on said support, said bearings being at one side of the support and said trunnion being at the other side thereof, and a work spindle rotatably mounted in said bearings, the axis of said spindle intersecting the other two axes, and means adjacent said support and said table and at one side of both for oscillating the work spindle and the table.

33. A machine for generating gear teeth having, in combination, a main frame, a supporting frame adjustably carried by said main frame and having a single trunnion support, bearings located on said supporting frame, said bearings being at one side of the support and said trunnion being at the other side thereof, a rotatably mounted cutter support, a rotatably mounted work-spindle, one of said parts, to wit, the cutter support and the work spindle, being mounted on said main frame and the other of said parts being mounted in the bearings, the axis of said cutter support intersecting the axis of said work-spindle and the axis of said trunnion intersecting the other two axes, cutters rectilinearly reciprocable upon said cutter support, and means for oscillating said cutter-support and said work-spindle for producing a sinuous cutting motion for generating a theoretically correct tooth-face.

34. A machine for generating gear teeth having, in combination, a cutter, a blank support, oscillating means for rolling the cutter and the blank support upon each other, and mechanisms for rotating and feeding the cutter, the axis of the cutter being inclined to the plane in which the cutter is oscillated, and the cutting face of the cutter being inclined at an angle to a plane perpendicular to said axis.

35. A mechanism having, in combination, a frame, a shaft rotatably mounted thereon, driving means rotatable upon said shaft for driving the same, a clutch slidably and non-rotatably mounted upon said shaft for engagement with said driving means, and actuating means for sliding said clutch whereby the movement of said clutch to engage said driving means is delayed and is thereafter quickly actuated, said actuating means comprising a slidable element, a cam member secured to said frame, a connecting member operatively connected with said slidable element and movable thereby, said connecting member further having a slidable connection with said cam member and a lost-motion connection with said clutch.

36. A machine for generating bevel-gear teeth having, in combination, a table, a cutter on the table, a blank support, means for oscillating the table and the blank support to roll the cutter and the blank upon each other, and mechanisms for rotating and feeding the cutter, the axis of the cutter being inclined to the plane in which the table is oscillated, and the cutting face of the cutter being inclined at an angle to a plane perpendicular to said axis, the angle of inclination of the cutter axis plus the angle of inclination of the cutting face of the cutter equaling the pressure angle of the gear teeth being generated.

37. In a bevel-gear generator, the combination of a cutter having a conical cutting face for the purpose described, means for oscillating the cutter, means for reciprocating the cutter, and means for rotating the cutter, the axis of rotation being inclined to the plane of oscillation.

38. A machine for generating bevel gears having, in combination, a base, a table oscillatable thereon, a rotatable cutter, a cutter support rotatably adjustable and rectilinearly reciprocable upon said table, and means for rotating said cutter comprising a rotatable driving member on said base and having a chamber therein, gearing connected to said cutter, a shaft connected to said gearing and including a universal joint, a disk slidably and non-rotatably supported upon said shaft, said disk lying in said chamber and devices loosely connecting said disk and said rotatable driving member.

39. A machine for generating gear teeth having, in combination, a gear-blank holder, a cutter adapted to occupy a tooth space, means for rotating said cutter, means for synchronously oscillating the gear-blank holder and the cutter, said oscillating means including eccentric means for oscillating the cutter and gear means operatively associated with said eccentric means for synchronously oscillating said gear-blank holder, means for automatically indexing said gear-blank holder independent of said oscillating means, and means for actuating all of said means.

40. A machine for generating gear teeth having, in combination, a main frame, a table mounted for oscillation on the main frame, a support, a trunnion thereon pivotally mounting said support on said frame for adjustment, the axis of said table intersecting the axis of said support at right angles, work-holding means mounted for oscillation on the support, the axis of said work-holding means intersecting the other two axes, and means located adjacent said support and said table for oscillating the work-holding means and the table.

41. In a machine, the combination of a base, a table oscillating thereon, a pair of guides each rotatably mounted upon the table, a cutter-supporting slide reciprocable upon each guide, reciprocating means including a pair of links each pivotally secured at one end to a slide and at the other to reciprocating means, and means for securing said guides in adjusted position upon said table.

42. A machine having, in combination, a cutter-supporting slide provided with a guide, a bearing supported by said guide and slidable thereon, a screw secured to said guide, a nut rotatably mounted in a recess in said bearing, and means for locking the bearing in adjusted position comprising a wedge slidable between said bearing and said guide, a screw secured in a recess in said bearing, and a nut rotatably mounted on said screw and in a recess in said wedge.

43. A machine having, in combination, a cutter-supporting slide provided with a guide, a bearing supported by said guide and slidable thereon, a screw secured to said guide, a nut rotatably mounted in a recess in said bearing, and means for locking the bearing in adjusted position.

In testimony whereof, I have hereunto set my hand.

GUSTAF DAVID SUNDSTRAND.